F. F. DASENBROCK.
DRAFT MECHANISM.
APPLICATION FILED JULY 11, 1917.
1,376,008. Patented Apr. 26, 1921.
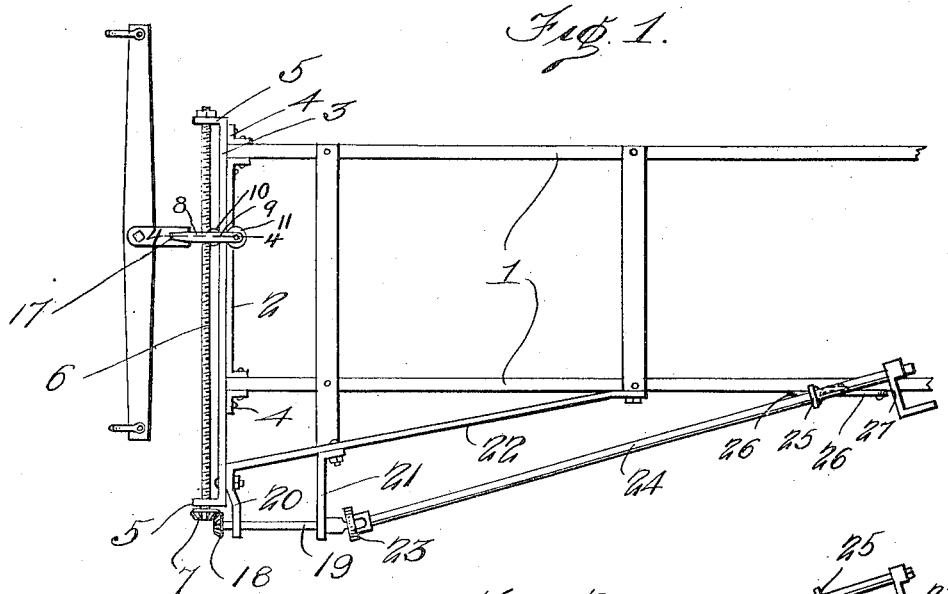
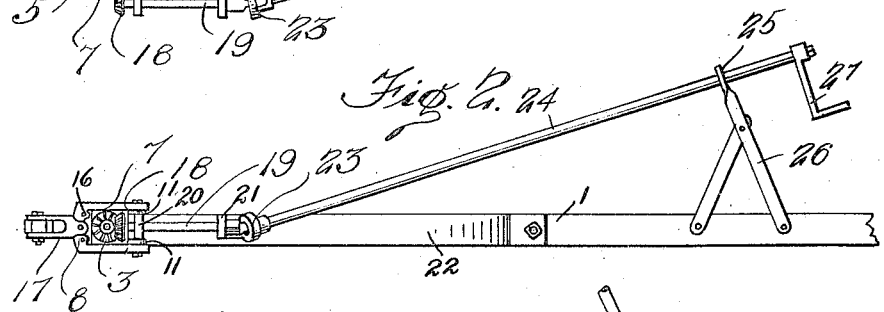
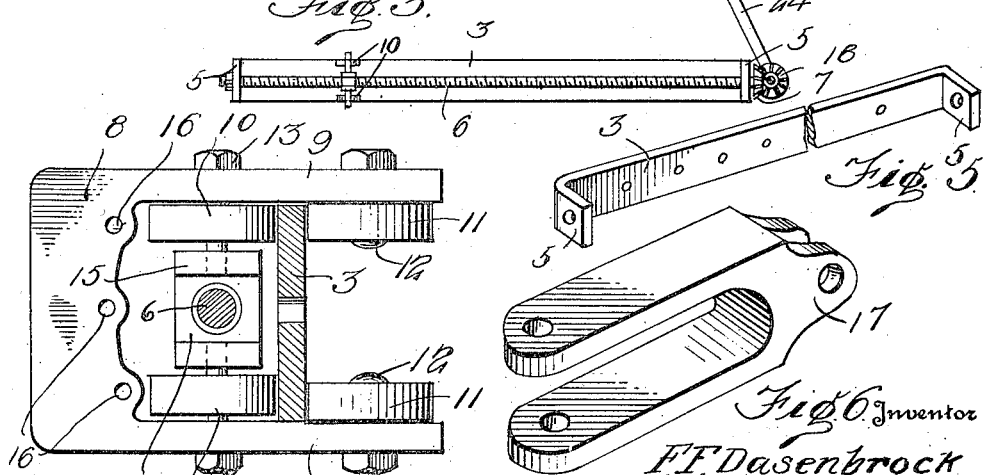
Inventor
F. F. Dasenbrock

UNITED STATES PATENT OFFICE.

FERDINAND F. DASENBROCK, OF TEUTOPOLIS, ILLINOIS.

DRAFT MECHANISM.

1,376,008.  Specification of Letters Patent.  Patented Apr. 26, 1921.

Application filed July 11, 1917. Serial No. 180,007.

*To all whom it may concern:*

Be it known that I, FERDINAND F. DASENBROCK, a citizen of the United States, residing at Teutopolis, in the county of Effingham, State of Illinois, have invented certain new and useful Improvements in Draft Mechanism; and I do hereby declare the following to be a full, clear, and exact description of the invention, such as will enable others skilled in the art to which it appertains to make and use the same.

This invention relates to draft mechanisms, and has particular reference to draft devices for plows.

The object of this invention is to provide an improvement in draft mechanisms for gang plows or sulky plows whereby the line of draft may be instantaneously altered, without unhitching the team and without the necessity of the driver leaving his seat. To this end I have provided a draft head which is movable transversely of the front end of the plow frame and rides thereon upon a track-way, the adjustment being effected through the medium of a screw which also extends transversely of the frame and has an operative connection with the draft head.

With the above objects in view, and such others relating to the details of construction, as may hereinafter appear, my invention will now be fully set forth and described, reference being had to the accompanying drawings.

In the drawings:—

Figure 1 is a plan view of a gang plow frame having my invention applied thereto, Fig. 2 is a side elevation thereof, Fig. 3 is a front elevation, Fig. 4 is an enlarged sectional view on the line 4—4 of Fig. 1, and Figs. 5 and 6 are detail perspective views of different parts of the mechanism.

Referring more particularly to the drawings, 1 represents the side members of the frame of a gang plow, which are connected at the front by means of a head beam 2 whose inturned ends are secured by the inner sides of the members 1. Secured to the head beam 2, and also transversely of the frame, is the draft bar 3. Said draft bar 3, aside from its connection with the head beam 2 is connected to the side members, by means of the angle brackets 4 located on the outside of said side members. The draft bar 3 is of considerably greater width than the head beam 2 so that it extends above and below the latter, and the said bar has its ends outturned to provide the bearing brackets 5. Mounted in the bearing brackets 5 are the ends of a worm screw 6, which, at one end extends beyond the corresponding bearing bracket 5 and has keyed thereon a bevel gear 7.

A draft head 8 is formed of a metal casting in substantially U-form, the arms 9 thereof providing bearings for the pairs of rollers 10 and 11. The rollers 11 are mounted upon spindles 12 mounted in the extremities of the arms 9, and bear upon the rear face of the draft bar 3, rolling just inside of the edges thereof. The rollers 10 are mounted upon spindles 13, and are spaced from the rollers 11 a distance which is slightly greater than the thickness of the bar 3, so that they may roll upon the outer face of the latter but will also, by reason of the excess space therebetween, permit a suitable degree of rocking motion of the draft head relative to the line of draft. It will be understood that by mounting the draft head for oscillatory movement upon the block, the head may turn slightly with relation to the block when the plow is for example turning a corner, and when the head is so moved the rollers 10 and 11 will suitably bind against the front and rear faces of the draft bar 3 so that this bar will bear all of the strain incident to the side pull exerted and none of the strain will be imposed upon the shaft 6. The spindles 13 are extended inwardly beyond the rollers 10 and there provide rocking supports for the draft head 8 upon a block 14 which is provided with a transversely extending threaded aperture within which the worm screw 6 is threaded and operates. The bearing block 14 is provided with off-sets 15 within which the spindles 13 are journaled, so that a proper oscillatory movement is permitted between the draft bar and the draft head. The head 8 is provided with a number of apertures 16 to which a clevis 17 may be secured.

As hereinbefore stated the worm screw 6 is provided with the bevel gear 7 and this gear meshes with a bevel gear 18 mounted upon one end of a shaft 19. The shaft 19 extends longitudinally of the plow frame and is mounted in brackets 20 and 21 which are secured respectively, upon the end of the draft bar 3 and a diagonally directed brace bar 22, the latter being provided to brace the extended end of the draft bar. A universal joint 23 connects the shaft 19 with a shaft 24 which extends diagonally inward and upward to a bearing 25 which is provided upon the upper end of a supporting frame 26 mounted upon the side of the plow frame. The rear end of the shaft 24 is provided with a hand crank 27 through the medium of which the shaft 24 may be rotated in order to operate the worm screw 6 through the intervening gear elements and the like.

In the use of my improved draft mechanism it is possible to mount it upon gang plows which are already in use, and when applied, avoids the need of a number of draft evener devices in that the adjustable draft head permits a single set of double-trees to be employed for different lines of draft. Furthermore, a more accurate adjustment of the proper line of draft is possible, since the intermediate steps between the lines of draft permitted by an interchange of a number of sets of evener bars are attainable, so that a more accurate and satisfactory operation of the gang plow is possible.

It will be apparent that I have provided a draft mechanism which will satisfactorily solve the problem of evening the draft of a gang plow, not only because it permits an accurate adjustment of draft, but because it also provides for the adjustment while the plow is in use, that is while the team is hitched up and the driver is on the seat.

What I claim as my invention is:—

1. In a draft device of the class described, a rotatably mounted worm shaft, means for rotating the shaft, a block fitting the shaft and adjustable longitudinally thereof in the rotation of the shaft, and a draft head pivotally connected with the block for oscillatory movement.

2. In a draft device of the class described, a rotatably mounted worm shaft, means for rotating the shaft, a block fitting the shaft and adjustable longitudinally thereof in the rotation of the shaft, a draft head pivotally connected with the block for oscillatory movement, and means for limiting the oscillatory movement of the said head.

3. In a draft device of the class described, a draft member, a worm shaft rotatably mounted thereon, means for rotating the shaft, a block fitting the shaft and adjustable longitudinally thereof in the rotation of the shaft, a draft head having spaced portions extending above and below the draft member and the said block, spindles carried by the said portions of the draft head and engaging the said block whereby the head is supported for oscillatory movement upon the block, rollers mounted upon the said spindles in position to engage one side of the draft member, and other rollers mounted upon the said spaced portions of the draft head in position to engage the opposite side of the said draft member, whereby to limit the oscillatory movement of the head.

4. In a draft device of the class described, a rotatably mounted worm shaft, a draft bar extending in rear of and parallel to the said shaft, a block fitting the shaft and adjustable longitudinally thereof in the rotation of the shaft, means for rotating the shaft, a draft head mounted for transverse rocking movement upon the said block, and spaced means carried by the draft head for engaging opposite sides of the draft bar upon rocking movement of the head upon the block.

In testimony whereof I affix my signature in the presence of two witnesses.

FERDINAND F. DASENBROCK.

Witnesses:
HENRY PRUEMER,
HERMAN J. RUNDE.